Sept. 16, 1958 J. J. HAGOPIAN 2,852,761

MAGNETIC RECORDING AND READING APPARATUS

Filed Jan. 10, 1955

INVENTOR.
JACOB J. HAGOPIAN
BY
Lippincott & Smith.
ATTORNEYS

United States Patent Office 2,852,761

Patented Sept. 16, 1958

2,852,761

MAGNETIC RECORDING AND READING APPARATUS

Jacob J. Hagopian, San Jose, Calif., assignor to International Business Machines Corporation, New York, N. Y., a corporation of New York Application January 10, 1955, Serial No. 480,871

3 Claims. (Cl. 340—174)

Figures 1, 2:
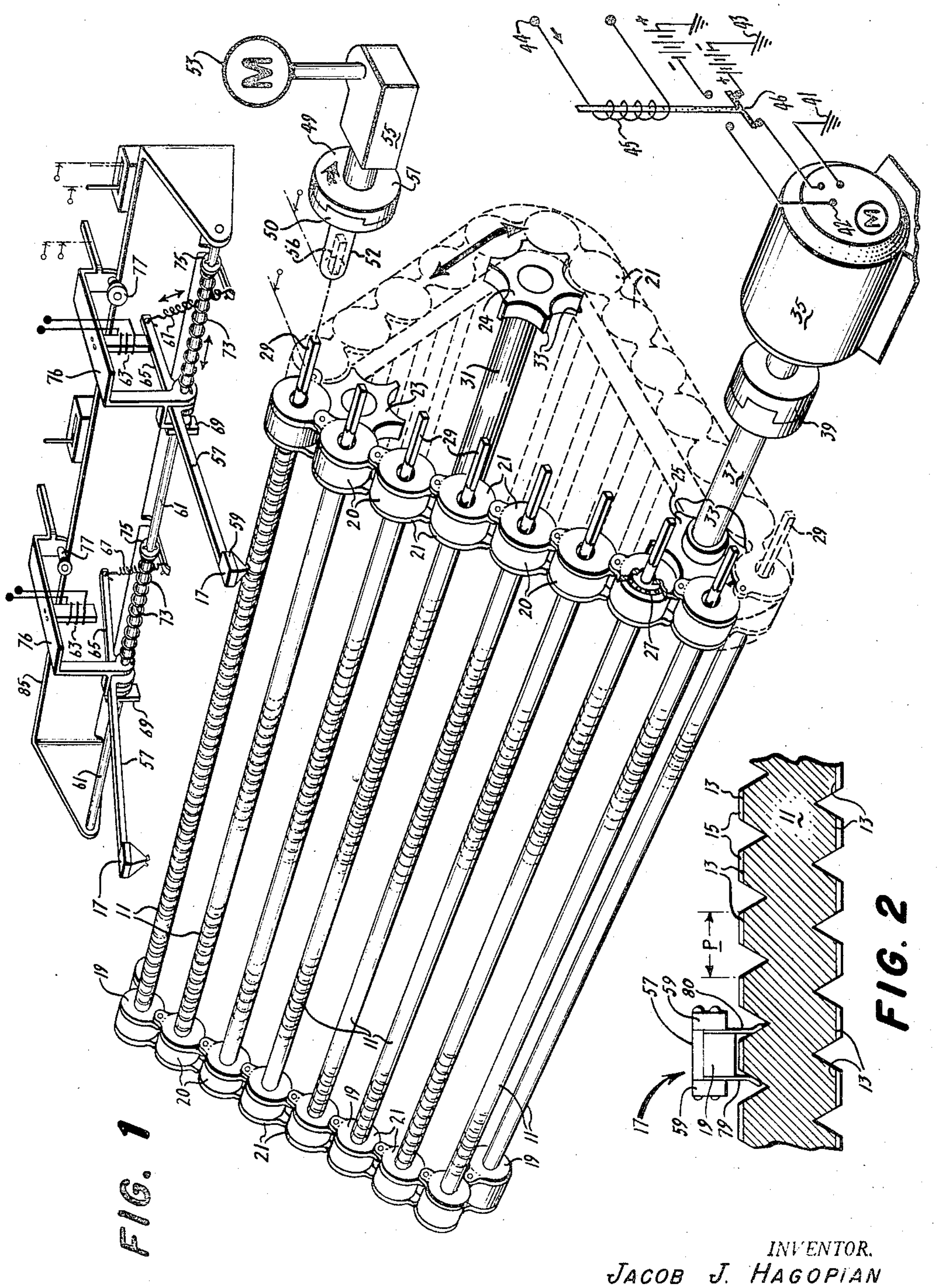

This invention relates to magnetic recording and reading apparatus of a type particularly useful for data storage. In computing apparatus it is frequently desirable to store trains of information as records which are later to be selectively used and from which transcriptions or readings may be made. This is particularly true in the case of a system of magnetic digital recording apparatus wherein a multiplicity of messages or unit records are to be stored and then arranged for selective transcription or reading by suitable transducer heads.

By the present invention a plurality of suitable feed spindles or screws individually having along their outer periphery a suitable magnetic surface extending in a helical path longitudinally of the spindle axis is used as the message or information carrier. Each feed spindle is long enough to contain a considerable number of separate unit records, the intelligence of which may be recorded thereon or transferred therefrom by suitable transducer heads which are adapted for electromagnetic engagement with the magnetic area of the feed screw. While it is unimportant to this particular invention the stored data may be of the sort usable in binary counting systems and thus may be merely pulses of positive or negative character.

One form of this invention utilizes feed screws in the form of threaded spindles having the outer edges of each of the threaded turns thereof flattened and providing a surface area extending along a helical path and upon which flattened area the information desired may be stored.

The messages or intelligence appearing as a magnetic record on the surface of feed screw threads may be suitably recorded for storage or reproduced or read for utilization either by separate transducer heads properly located for each unit screw section or by a single transducer head suitably arranged to traverse the proper unit record location in order that the recording and reading may be accomplished. The invention also provides for utilizing a plurality of feed screws or spindles thereby to provide greater message capacity. Provision is then made for selecting between the different spindles by a suitable selective drive through which the various spindles are connected and by which they may be rapidly shifted with respect to the transducer heads. One suitable form for such a drive is an endless belt for which a suitable link-drive motor controlled, illustratively, from a screw counter or potentiometer pick-off may provide the moving force.

The invention, furthermore, makes provision for registering of the various transducer or reading heads and the various record tracks by means of a guide mechanism which rides along the threads of the screw and in toward the root of the screw having the ground flats to provide the recording surface. Each transducer head guide has extending from it suitable positioning or engaging fingers for limiting the instantaneous engagement of the transducer head to a single turn of the spiral path of the helix only. Engagement of the drive to rotate each spindle is provided through any desired form of commutating mechanism which is usually controlled by means of a programming unit or the equivalent.

From the foregoing, the objects of the invention include those of providing a form of magnetic recording medium by which it is possible to obtain accurate tracking of the transducer head and the recording and to insure correct relationship between the two components.

A further object of the invention is that of including in the mechanism a multiplicity of feed spindles each long enough to provide a multiplicity of recorded tracks of information and to establish selection between different portions of different tracks according to a desired programming operation.

A further object of the invention is to use a flattened screw as a feed spindle for establishing relative motion between the transducer head and the feed spindle.

A still further object of the invention is to provide a ready and simple means for having access to separate records on the multiplicity of spindles or upon one and the same spindle.

Other objects and advantages of the invention will become apparent from the consideration of the following description and claims when read in connection with the accompanying drawings wherein:

Fig. 1 is a schematic view, largely an isometric, showing a suitable relative arrangement of the multiplicity of feed screws and transducer heads; and Fig. 2 is a greatly enlarged view schematically representing the general form of feed screw and transducer head positionally related thereto.

Referring now to the drawings, the feed spindles 11 upon which the separate information or message signals are to be recorded are arranged in the general order indicated by Fig. 1. The separate spindles are each in the form of a feed screw, the outer edge of each helical turn of which is appropriately flattened.

By Fig. 2 a greatly enlarged view of one section showing a few turns of the helical feed screw or spindle has been represented. The pitch of the helical turns, as represented at $p$ is set at a value to provide adequate recording width for cases where the outer edge 13 of each turn of the thread is flattened. For the purpose of this invention it is not critical as to the exact type of flattened screw thread which is used but, illustratively, the thread member may be of the general form known in the trade as either the Acme or the B & S worm thread. It will be appreciated that an unflattened steel screw might be used as the record storage element in which case the complementary transducer head would have generally V-shaped configuration, but this is usually not to be preferred due to the desirability of maintaining the screw and head out of direct contact. As will be noted from what is to follow a V-shaped screw would almost necessitate contact between the guide means and the record area which is usually to be avoided.

The outer edge 15 at least of each of the flattened areas of the screws is coated with a suitable magnetically responsive medium, such as a red oxide of iron ($Fe_2O_3$), or there may be appropriately secured thereto a tape of width corresponding to the flattened area which is coated or impregnated with a magnetic-powder medium for the purpose of storing therein a magnetic record. Arranged to be in magnetic contact with the magnetically sensitive surface area 15 are a multiplicity of magnetic transducer heads conventionally represented at 17. These magnetic heads, as is well known, usually comprise two magnetic pole pieces of some material such as Permalloy, conventionally represented at 19, which are separated by a gap of any desired width, usually of the order of a very few thousandths of an inch. It is customary to fill the gap with a non-magnetic material (not shown), which frequently is beryllium-copper or silver, although these substances are named in a purely illustrative and not limiting sense.

As is well known, where the magnetic surface, such as 15, is brought into electromagnetic contact with a magnetic head which has a winding suitably wrapped about each of the pole pieces with one end of the winding wrapped about each pole piece and the free ends connected into a suitable circuit the flow of current into the winding about the pole pieces will cause the development of a magnetic flux in the pole pieces and provide for recording signals on the surface 15. As is well known, the unmagnetized recording surface 15 prior to this time will have its magnetic particles randomly distributed but when the surface is passed before the pole pieces of the recording transducer head the magnetizing force along the direction of motion causes the magnetic particles to be rotated so as to lie in the direction of the field and thus provide a recording which can later be translated.

After the message or information has been recorded on the surface 15 and the transducer head is placed in electromagnetic contact relationship to the flattened surface area and the screw is rotated relative to the transducer head so that different sections of the flattened surface continually pass beneath the magnetic head a flux is induced into the pole pieces which causes a voltage to be developed in the coils in accordance with signal energy recorded upon the magnetic surface. For this condition an output signal is caused to flow in the electrical circuit and such signal is measured in accordance with the intelligence placed upon the magnetic record.

Where it is desired to provide a great many unit records designating different characters of intelligence, as particularly usable in a magnetic digital system, the data separately recorded on the flattened areas of the coated screws may be removed by causing a tracking relationship to be established between the threads of the screw and any one of the several transducer heads.

In the majority of uses, particularly in connection with the magnetic recording systems of the digital type, it is important that the separate messages be read from the recorded group as rapidly as possible. To this end the present invention provides for utilizing a plurality of separate transducer heads arranged individually to establish electromagnetic contact with the flattened surface areas of individual helical turns of the screw thread. The establishment of electromagnetic contact may be by direct physical contact between the transducer head and the flattened surface area, but with the message or recorded intelligence recorded in the flattened surface area of the helical turns and there being frequent readings of the same message it is usually desirable in order to eliminate needless wear that the transducer head be held in its closest position to the flattened surface area 15 so that there is a spacing in the range between one and three thousandths of an inch between them, it being borne in mind that the width of the slot between the two magnetic pole pieces of the transducer is generally of the same order of width as the spacing maintained between the transducer head and the flattened surface area of the screws.

A great quantity of separate intelligence signals may be stored through the utilization of a multiplicity of separate feed spindles, each in the form of elongated screw elements having the outer edge of each helical turn flattened. The total message carrying space for separate intelligence indications is considerably more usable for a large number of small diameter components, such as the spindles 11, than from a large drum of the sort often heretofore used.

Each separate spindle 11 is supported for rotational movement at either end in a bearing element 20. The individual bearing elements 20 are held in linked relationship by individual sections or links of an endless chain 21. The chain, as a whole, is stretched by and supported from a plurality of sprocket elements 23, 24 and 25 of which sprocket elements 23 and 24 may be considered as idlers, while sprocket 25 may be considered as a driver.

As can be seen from the cutaway portion of one of the lower links of the endless chain 21 the bearing members in which each end of the feed spindles or screws 11 is mounted usually comprise a ball race 27 to provide for ready and friction-free motion and turning. The ends of the feed screws protruding beyond the chain 21 at one side are each formed to extend as a generally square shaped element 29 for engagement with the driven end of a drive clutch mechanism to provide rotation, as will be explained later.

The chain links which carry the various feed spindles or screws 11 may be driven about a generally triangular path defined by the location of the idler sprockets 23 and 24 and the driver sprocket 25, each of which is supported upon a shaft such as that schematically indicated at 31 for the idler sprocket 24. The free ends of the shafts, such as 31, supported in bearing members (not shown) which may be fixed in position, or which may be adjustable in position, if desired, to establish the desired tautness of the chain links or to provide for different lengths of chain and therefore different numbers of feed spindles 11. As the arrangement has been shown, the driving sprocket 25 of which the teeth, such as those conventionally shown at 33, are arranged successively to fall within the open spaces between the various links of the chain serve, with rotation, to drive the chain links clockwise or counterclockwise, as determined by the direction of rotation of a spindle-driving motor, conventionally represented at 35.

The motor 35 drives a shaft 37 which is connected to the driving sprocket 33 by means of a conventionally indicated clutch 39. The motor 35 has its armature, for instance, or its field coil, so connected that current can flow through it in either of two directions. To this end one connection may be made to ground 41. Two other points of connection are provided, at points conventionally represented at 42 and 43, from which control and energizing voltages may be supplied to flow through the winding (not shown) in one direction or the other to provide forward or reverse motion of the motor. Voltage is supplied at input terminals 44 to operate the solenoid 45 of a control switch, schematically shown at 46. The motor is driven in one direction, say clockwise, with the switch armature against the upper contacts and in the reverse direction, say counterclockwise, with the switch armature against its lower contact points. With the switch armature in its intermediate position, as schematically shown by the drawing, drive to the motor is disconnected and the sprocket chain 21 remains stationary.

Energy supply to the solenoid 45 to operate the motor switch control 46 may be appropriately established in any desired manner, not here shown or explained but which can be controlled in accordance with the computing operation desired. The control may be established by means of a selectively operated programming unit of any sort, as is well known in the art. Illustratively, but not limiting, the selection may be established to this motor 35 by a suitable rotary potentiometer or binary output commutator arranged selectively to operate the control switch 46 so that appropriate control signals for the motor will determine the selection of the individual feed screw containing the instantly desired unit record.

With the selection of the desired unit record, as established by a movement of the various chain links, and consequently a positioning of one or the other of the feed spindles or screws 11 in a desired position relative to the magnetic heads or transducer heads 17, a disconnection or interruption of the supply of driving current to the motor 35 a selection is established.

Upon selection of a particular feed spindle or screw and the positioning thereof in a relationship to the magnetic heads such that electromagnetic contact between a transducer head and selected portions of the flattened areas of the helical turns of the screw 11 can be established the screw is next rotated. This is accomplished in one form of the invention by means of a schematically shown magnetic clutch 49 which is engaged by any appropriate form of signal control and which may be established concurrently with the arrest of driving current to the motor 35. Engagement of the separate sections 50 and 51 of the magnetic clutch 49 provides a driving connection to a driven shaft 52 when current is applied to a conventionally represented motor 53. The motor drives the shaft 52 through appropriate gearing, schematically shown by the gear box 55. The feed spindle or screw 11 is caused to rotate illustratively in a clockwise direction when the squared end 29 engages the squared recess 56 in the driven shaft 52. Concurrently with a rotation of the screw 11 one or more of the transducer heads 17 is brought into electromagnetic contact with the flattened surface of one turn of the helix.

In the preferred form of the invention the transducer heads are carried upon separate operating arms 57 which preferably terminate at the forward end in a yoke 59 suitably to hold the transducer head. The arms are preferably pivotally mounted and supported for longitudinal motion relative to a support spindle or rail 61 to be moved within appropriate limiting range thereon.

In the case where a plurality of transducer heads is to contact the flattened helical turns of the feed screw one or more of the transducer heads is carried into engagement with the helical turns, as desired. In Fig. 1 two such transducer heads and support mechanisms are illustrated, although it will be appreciated this is purely by way of a diagrammatic showing and operation since it frequently is customary to provide more than two such mechanisms. With the transducer head support elements 57 provided for both longitudinal motion relative to the guide spindle 61 and also for rotational movement thereabout it will be appreciated if the end 65 of the support arm 57 which is remote from that which holds the transducer head be of a material such that it can be moved under the influence of a developed electromagnetic field, the energization of a suitable head engaging solenoid, such as that shown at 63, which is also supported for longitudinal movement relative to the guide rod 61 will cause the end of the support element 57 to be moved upwardly against the force of a spring member, such as that shown at 67, to cause the transducer head 17 magnetically to contact the flattened surface of the feed screw 11. In the preferred embodiment of the invention the various transducer heads and their support mechanisms are rested against a stop 69 (shown immediately to the left of the pivotal mounting for the support arm 57), by the force of a spring 73 anchored against collars 75. The compression spring 73 is also fitted about the guide spindle 61 so that when the heads 17 are held away from the screw 11 the assembly is forced to the left (as herein shown) by the force exerted. The free end of the yoke 76 which guides the arm 57 is mounted to rest by roller contact 77, for instance, upon a second guide or track 85. Motion of the support arm 57 may be from left or right, depending upon whether there is engagement or disengagement between the transducer head and the helical turns of the feed screw. Disengagement permits the compression spring 73 to provide the motion to the left from the position shown. However, for a case where electromagnetic engagement between the transducer head and the feed screw is established as a result of current flow to activate solenoid 63, the yoke moves (as will later be explained) to the right against the spring pressure.

Each activated solenoid is controlled from a separate programming unit to provide the desired travel of the transducer head with spindle rotation. As the transducer heads 17 are brought into electromagnetic engagement with the flattened helical surface on each turn of the spindle precise registry between the head and the spindle is achieved by virtue of a pair of guide fingers 79 and 80 arranged at either side of each transducer head. The guide fingers are separated by a distance slightly less than the screw pitch "*p*" but slightly more than the flattened width of each helical turn of the screw so that when the solenoid 63 is energized to cause the support arm 57 to move the transducer head toward the feed spindle 11 the guide fingers tend to position themselves in one of the V-slots between the flattened surface of each helical turn. Then, with energization of the solenoid and due to the face that the guide fingers 79 moving inwardly toward the screw root tend to limit the rotation of the arm 57 carrying the transducer heads lateral motion is provided and an abrupt positioning of the transducer head relative to the flattened helical turns occurs. This insures that the precise establishment of the positioning arrangement between the components will be such that the message may be translated or read at the desired portion of the helical turns on the screws 11. With the feed screw 11 rotating and the solenoids 63 energized at various times the precise instant of movement of the transducer heads to establish electromagnetic contact may vary. Under such circumstances, by causing the guide fingers 79 and 80 to move toward the bottom of the V-slots and with the outer edge of the fingers shaped to complement the slot shape the transducer head is maintained at a distance from the outer flattened edge of the screw which corresponds to its height above the outer edge of the guide fingers, it being understood that the guide fingers will penetrate substantially to the root of the screw. For these conditions the relationship established when a solenoid 63 is energized to move a transducer head into electromagnetic engagement with the screw makes it possible to shift the transducer head rapidly so that the relationship of the so-called "dead spot" over which it is desired that no message be read to a complete helical turn bears a relationship which is proportional to that existing between the width of the flat portion of the screw to the screw pitch and the amount of uncertainty in the positioning is removed.

Having now described the invention what is claimed is:

1. Magnetic data storage apparatus comprising a magnetic screw having the outer surface of each helical turn flattened, a magnetic surface area extending along the flattened surface area and adapted to include at separated sections of the helical turns a plurality of separate trains of information, a plurality of separate transducer heads adapted for electromagnetic engagement with the magnetic areas of the flattened surface of the feed screw, a guide means at opposite edges of each head for straddling the magnetic flattened surface areas and tracing a path along each side of the flattened area to bring the head and the flattened magnetic area into tracking relationship, means normally to bias each head away from engagement with the feed screw, means to establish an electromagnetic engagement between selected heads and the feed screw at selected intervals and means to provide with screw rotation relative longitudinal movement between the feed screw and the magnetic head brought into tracking relationship therewith.

2. In magnetic data storage apparatus, a feed screw having the outer edge of its helical turns flattened and the axial length of each flattened portion less than the helix pitch, a magnetic surface area extending along the flattened surface of the helical turns, means to rotate the feed screw at a substantially constant rate, said feed screw being adapted to have trains of information recorded as magnetic records in the magnetic surface area of the helical turns, a plurality of transducer heads adapted for engagement with the flattened areas of the helical turns at relatively displaced points on the screw length, means for normally biasing the heads away from engagement with the helical turns and normally maintaining the heads in an initially fixed position relative to the length of the magnetic areas, means for separately carrying the heads into electromagnetic engagement with the helical turns of the feed screw and guide means for establishing an engagement between the selected head and one turn only of the helix and for initiating the engagement at a selected point on a helical turn and establishing the electromagnetic engagement at a time period in the range between instantaneous engagement and a delay corresponding to the time period of each rotation of the helix minus the time period of rotation to move a point across the flattened helical surface to establish precise electromagnetic engagement between the head and the helix at a preselected point in the rotational path.

3. Magnetic data storage apparatus comprising a plurality of feed screws each having the outer portion of the helical turns thereof flattened, a magnetic surface area extending along the flattened surface area and each screw being of a length sufficient to contain a plurality of separate unit trains of information as a magnetic record, means for connecting and linking the plurality of feed screws together in endless belt fashion, a plurality of transducer heads positioned substantially adjacent to one of the feed screws in its endless belt position, said heads normally being held in disengaged relationship relative to the feed screw, means for rotating the feed screw of the endless belt array instantaneously in adjacent relationship to the transducer heads, means for normally maintaining each of the transducer heads in its disengaged relationship in a position longitudinally fixed relative to the helical turns of the lead screw within a tolerance of one helical turn minus the width of the flattened surface, a pair of guide fingers attached to each transducer head, means for selectively electromagnetically engaging the transducer heads and the feed screw adjacent thereto and establishing an initial engaged position therebetween by the guide fingers longitudinally shifting the magnetic head longitudinally of the feed screw, by guide fingers being forced by the engaging means to extend toward the root of the screw, means to shift and select between different feed screws by moving selected feed screws into a relationship relative to the magnetic heads at time periods when the magnetic heads are removed from electromagnetic engagement with the feed screw such that emergization of the engaging means may associate the heads with the screw, and means for establishing a relative longitudinal movement between the feed screw and the magnetic heads brought into engagement therewith during periods of engagement.

References Cited in the file of this patent

UNITED STATES PATENTS

| | | |
|---|---|---|
| Re. 23,602 | Mann | Dec. 23, 1952 |
| 1,140,471 | McFell | May 25, 1915 |
| 2,229,293 | Huntley | Jan. 21, 1941 |
| 2,433,207 | Eilenberger | Dec. 23, 1947 |
| 2,509,012 | Morrison | May 23, 1950 |
| 2,611,813 | Sharpless | Sept. 23, 1952 |
| 2,620,389 | Potter | Dec. 2, 1952 |